UNITED STATES PATENT OFFICE.

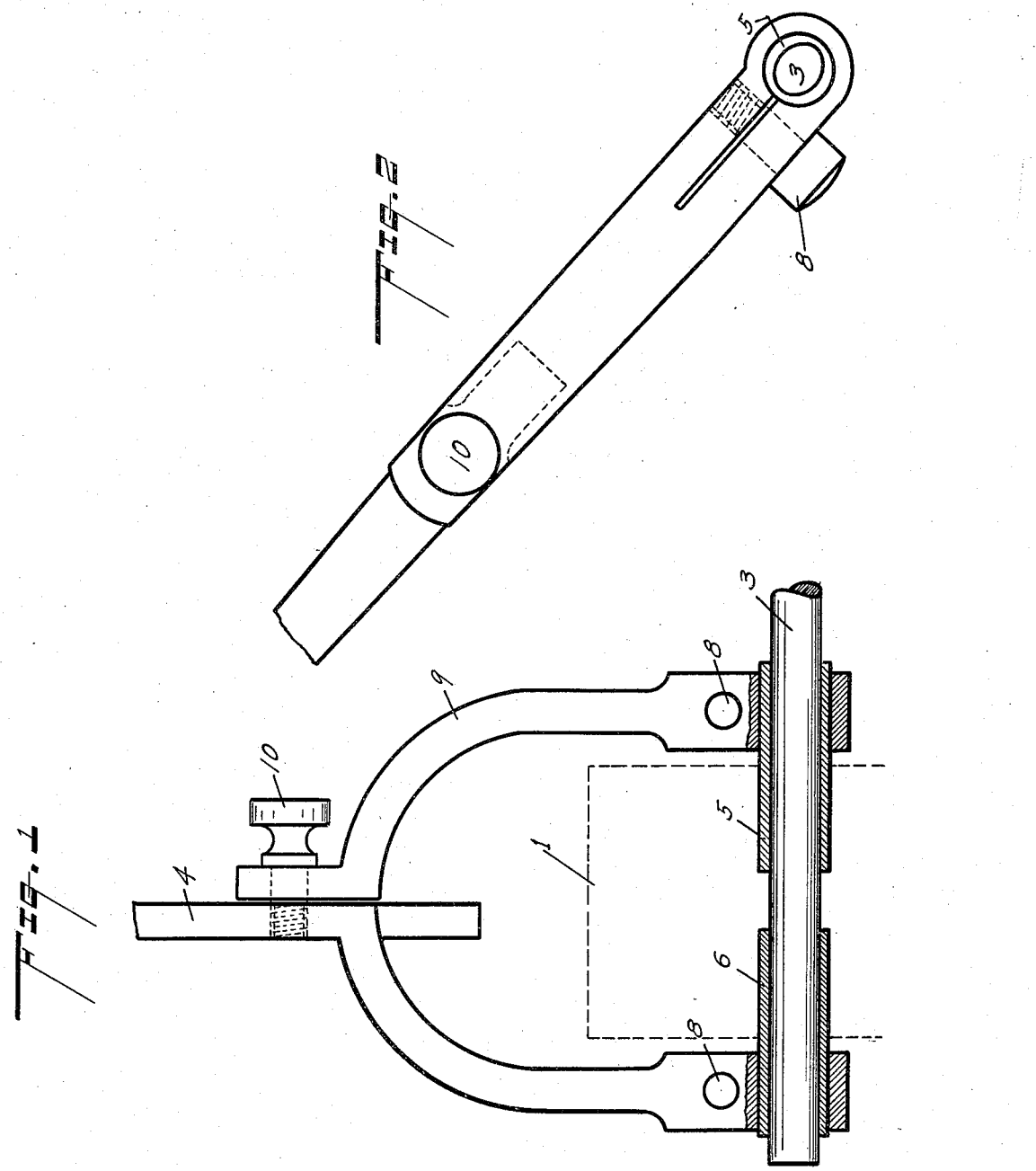

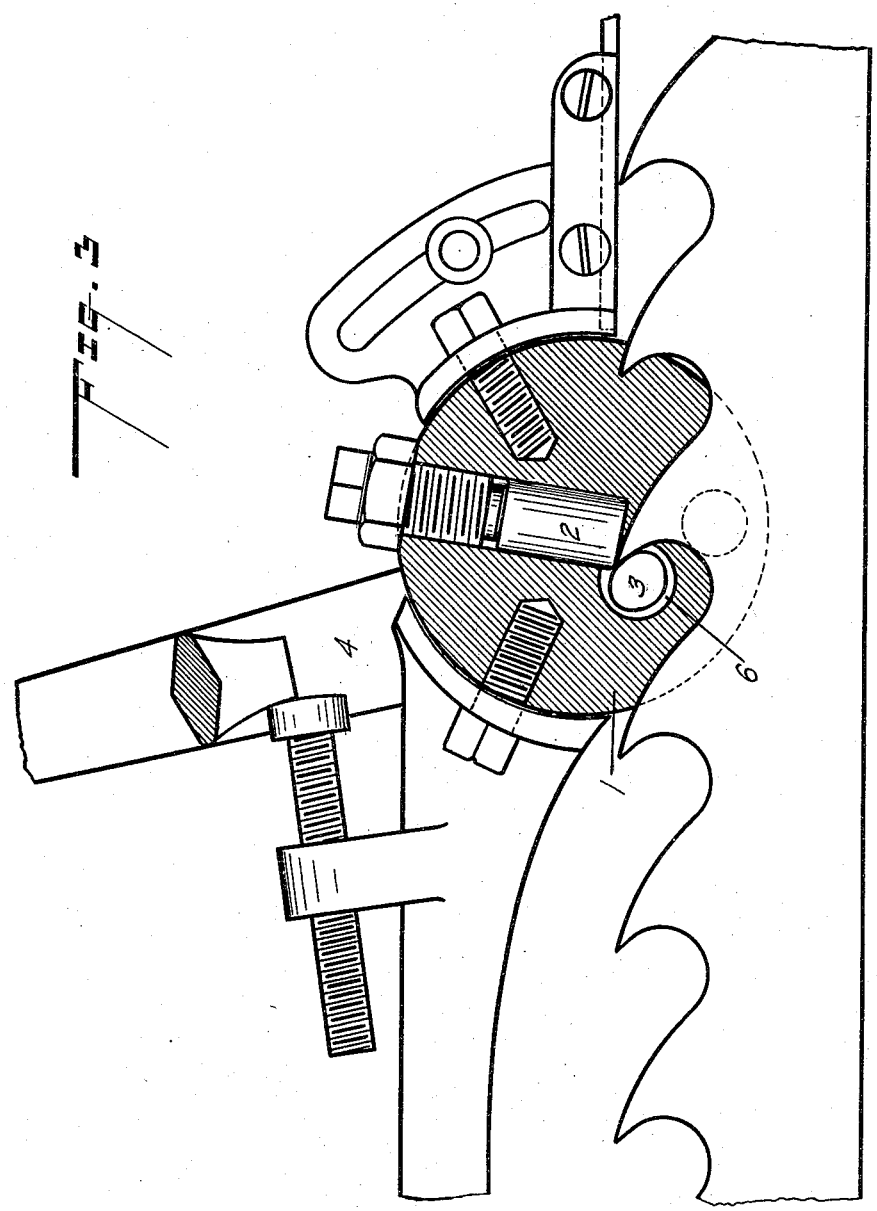

JOHN P. HEDSTROM, OF BIG RAPIDS, MICHIGAN, ASSIGNOR TO HANCHETT SWAGE WORKS, OF BIG RAPIDS, MICHIGAN, A CORPORATION OF MICHIGAN.

SWAGE.

1,173,509.  Specification of Letters Patent.  Patented Feb. 29, 1916.

Application filed July 14, 1914. Serial No. 850,897.

*To all whom it may concern:*

Be it known that I, JOHN P. HEDSTROM, a citizen of the United States, residing at Big Rapids, in the county of Mecosta and State of Michigan, have invented certain new and useful Improvements in Swages; and I do hereby declare the following to be a full, clear, and exact description of the invention, such as will enable others skilled in the art to which it appertains to make and use the same.

This invention relates to saw swages and pertains more particularly to swages of the type commonly used for flattening the teeth of band saws and the like.

The objects of my invention are, first, to provide in combination with a saw swage and the usual swaging anvil an improved form of swaging die and an improved swaging lever, whereby means is provided for changing the working position of the die against the saw tooth and the anvil, to permit the die to present new wearing surfaces when it has become worn in places.

My improvement provides a form of die having four wearing surfaces that extend practically the full length of the die.

Another object of my improvement is to provide a handle construction that will enable the die to be removed from the swage easily and quickly without disturbing the relative adjustment of the die and anvil when the die is again put in position. When the die is removed the operator is enabled to look through the opening left by the die to see the relative positions of the anvil, the die and the saw tooth.

A still further object is to so mount the die in bushings received in the swage head that the position of the die may be shifted to present a new wearing surface by merely moving the die endwise and when one edge of the die has become worn throughout practically its entire length the die may be removed from the swage, turned over and put back into the head, to expose a new wearing surface, extending throughout the entire length of the die.

With these and certain other objects in view, which will appear later in the specification, my invention consists in the devices described and claimed and the equivalents thereof.

In the drawings, Figure 1 is a part sectional front view of the swage handle with the die and bushings in place. Fig. 2 is a side view of the same. Fig. 3 is a part sectional view of the swage head with the die and anvil in position to swage the tooth of a band saw.

In the drawings, 1 represents the swage head carrying the usual anvil 2 and the die 3 adapted to be actuated by the swaging lever 4.

In carrying out my invention, I provide a pair of bushings 5 and 6 slidably received in a suitable opening that extends through the swage head from side to side. The bushings are bored lengthwise to receive a die 3 preferably of tool steel and preferably of oval or equivalent cross section. The die is preferably concentric with the bushing, or may be located in any other suitable position with relation to the axes of the bushings if desired. The outer ends of the bushings preferably project beyond the side faces of the swage head 1 and are gripped by the lower ends of the bifurcated swaging lever 4, being clamped by means of suitable clamping screws 8.

One leg 9 of the bifurcated swaging lever 4 is removable, and when removed carries with it the corresponding bushing 5. When in place the leg 9 is clamped to the lever 4 by means of a suitable clamping screw 10.

It will be noted that the cross section of the die 3 is the same throughout its length, so that any convenient or desired length of die may be employed in order to secure as many new wearing surfaces as possible, practically the entire length of the die being available for the actual work of swaging.

By using an oval or equivalent shaped die, such as 3, it will be noted that the die will present four wearing parts extending the full length of the die.

By removing the clamping screw 10 and the removable leg 9 with its bushing 5, the die and anvil are left in place so the operator can look into the opening left by the bushing and see the position of the die, anvil and saw tooth. Also by removing the die, which can be done by merely drawing it out from the bushing, the operator can look through the opening and see the position of the anvil and the saw tooth. By this arrangement, the operator is enabled to inspect his work while it is in the swage and to accurately adjust the anvil to produce the correct shape and degree of swaging.

It has been noted that the movable bushings 5 and 6 extend outside the swage head and that the swaging lever 4 is attached to those bushings, therefore, when the die 3 is shifted to present a new wearing surface the positions of the bushings and swage lever are not changed, but the die merely moves along endwise until a proper surface is presented to the work. When one part of the die has been worn for nearly the full length, the die is pulled out of the swage, turned over and inserted through the bushings, whereupon another working strip of the die is presented, which can be progressively used throughout its full length. The oval die presents four such wearing strips, the shifting from one to another being effected by merely moving the die endwise and taking it out and turning it over.

Having thus described my invention, what I claim and desire to secure by Letters Patent is:

1. In a swage, the combination of a swage head, an anvil, a pair of oppositely disposed bushings removably inserted in said swage head, a bifurcated swaging lever having one leg removable, the legs of said lever being respectively secured to the projecting ends of said bushings; and a die received in said bushings.

2. In a swage, the combination of a swage head, an anvil, a pair of oppositely disposed bushings removably inserted in said swage head, a die of substantially elliptical cross section slidably received and removably mounted in said bushings, and means adapted to oscillate said bushings and die.

In testimony whereof, I affix my signature in presence of two witnesses.

JOHN P. HEDSTROM.

Witnesses:
EARL D. SANFORD,
H. J. HEYDENBURG.

Copies of this patent may be obtained for five cents each, by addressing the "Commissioner of Patents, Washington, D. C."